US012698716B2

(12) United States Patent
Warburg et al.

(10) Patent No.: US 12,698,716 B2
(45) Date of Patent: Aug. 4, 2026

(54) TURBINE ENGINE WITH A BLADE ASSEMBLY HAVING A SET OF COOLING CONDUITS

(71) Applicant: General Electric Company, Evendale, OH (US)

(72) Inventors: Thomas P. Warburg, West Chester, OH (US); Zachary R. Noeth, Loveland, OH (US); Kelli Marie Fishback, Liberty Township, OH (US); Marie Myers, Cincinnati, OH (US); Zachary Daniel Webster, Cincinnati, OH (US); Kurt Thomas Whittington, Maineville, OH (US); Kirk D. Gallier, Liberty Township, OH (US); Jared Peter Buhler, Lynn, MA (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 19/074,078

(22) Filed: Mar. 7, 2025

(65) Prior Publication Data

US 2025/0283415 A1 Sep. 11, 2025

Related U.S. Application Data

(60) Provisional application No. 63/562,542, filed on Mar. 7, 2024.

(51) Int. Cl.
*F01D 5/14* (2006.01)
*F01D 5/18* (2006.01)
(Continued)

(52) U.S. Cl.
CPC .............. *F01D 5/147* (2013.01); *F01D 5/18* (2013.01); *F01D 5/187* (2013.01); *F01D 5/186* (2013.01);
(Continued)

(58) Field of Classification Search
CPC . F01D 5/18; F01D 5/187; F01D 5/186; F01D 5/188; F01D 25/12; F02C 7/12; F02C 7/18; F05D 2240/301; F05D 2240/81
See application file for complete search history.

(56) References Cited

U.S. PATENT DOCUMENTS

| | | | |
|---|---|---|---|
| 4,501,053 A | 2/1985 | Craig et al. | |
| 5,462,405 A | 10/1995 | Hoff et al. | |
| (Continued) | | | |

FOREIGN PATENT DOCUMENTS

| | | | |
|---|---|---|---|
| DE | 102009025960 A1 | 12/2009 | |
| EP | 2037081 B1 | 12/2016 | |
| (Continued) | | | |

OTHER PUBLICATIONS

European Patent Office, "Extended European Search Report," issued in connection with European Patent Application No. 25162279.1, Jul. 11, 2025, 18 pages.

(Continued)

*Primary Examiner* — Phutthiwat Wongwian
*Assistant Examiner* — Rene D Ford
(74) *Attorney, Agent, or Firm* — Hanley, Flight & Zimmerman, LLC

(57) ABSTRACT

A gas turbine engine having a blade assembly with a platform, an airfoil, and a shank. The airfoil has a plurality of cooling conduits, and the shank has a plurality of inlet passages to provide cooling fluid to the cooling conduits in the airfoil. The cooling fluid is vented through a plurality of cooling holes along the airfoil. The blade assembly has specific geometries that improve durability.

14 Claims, 8 Drawing Sheets

(51) Int. Cl.

| | | |
|---|---|---|
| *F01D 25/12* | (2006.01) | |
| *F02C 7/12* | (2006.01) | |
| *F02C 7/18* | (2006.01) | |

(52) U.S. Cl.
CPC .............. *F01D 5/188* (2013.01); *F01D 25/12* (2013.01); *F02C 7/12* (2013.01); *F02C 7/18* (2013.01); *F05D 2240/301* (2013.01); *F05D 2240/81* (2013.01); *F05D 2260/20* (2013.01)

(56) References Cited

U.S. PATENT DOCUMENTS

| | | | |
|---|---|---|---|
| 5,993,155 A | 11/1999 | Endres et al. | |
| 6,227,804 B1 | 5/2001 | Koga et al. | |
| 9,810,070 B2 | 11/2017 | Johns et al. | |
| 10,156,144 B2 | 12/2018 | Quach et al. | |
| 11,199,096 B1 | 12/2021 | Papple et al. | |
| 11,401,821 B2 | 8/2022 | Krumanaker et al. | |
| 11,746,666 B2 | 9/2023 | Kim et al. | |
| 2003/0219338 A1* | 11/2003 | Heyward | F01D 5/081 |
| | | | 416/96 R |
| 2004/0126236 A1 | 7/2004 | Lee et al. | |
| 2009/0202339 A1 | 8/2009 | Torii et al. | |
| 2014/0338364 A1* | 11/2014 | Johns | F01D 5/084 |
| | | | 416/96 R |
| 2015/0110639 A1 | 4/2015 | Herzlinger et al. | |
| 2016/0146024 A1 | 5/2016 | Morris et al. | |
| 2016/0237833 A1 | 8/2016 | Tsypkaykn et al. | |
| 2016/0363052 A1 | 12/2016 | Miranda et al. | |
| 2018/0128113 A1 | 5/2018 | Hoffman et al. | |
| 2019/0284940 A1 | 9/2019 | Task et al. | |
| 2021/0301666 A1 | 9/2021 | Agudo et al. | |
| 2022/0025769 A1* | 1/2022 | Place | B22C 9/103 |
| 2022/0170376 A1* | 6/2022 | Hatta | F01D 5/18 |

FOREIGN PATENT DOCUMENTS

| | | |
|---|---|---|
| EP | 3483392 A1 | 5/2019 |
| KR | 102626194 B1 | 1/2024 |

OTHER PUBLICATIONS

European Patent Office, "Extended European Search Report," issued in connection with European patent Application No. 25162334.4, dated Jul. 15, 2025, 17 pages.

European Patent Office, "Extended European Search Report," issued in connection with European Patent Application No. 25162326.0, dated Jul. 15, 2025, 17 pages.

European Patent Office, "Extended European Search Report," issued in connection with European Patent Application No. 25162284.1, dated Aug. 4, 2025, 14 pages.

United States Patent and Trademark Office, "Non-Final Office Action," issued in connection with U.S. Appl. No. 19/074,060, dated Dec. 30, 2025, 11 pages.

* cited by examiner

TURBINE ENGINE WITH A BLADE ASSEMBLY HAVING A SET OF COOLING CONDUITS

CROSS-REFERENCE TO RELATED APPLICATIONS

This patent claims the benefit of U.S. Provisional Patent Application No. 63/562,542, titled "TURBINE ENGINE WITH A BLADE ASSEMBLY HAVING A SET OF COOL-ING CONDUITS," which was filed on Mar. 7, 2024. Priority to U.S. Provisional Patent Application No. 63/562,542 is hereby claimed.

TECHNICAL FIELD

The present subject matter relates generally to a blade assembly for a turbine engine, and more specifically to a turbine engine with a blade assembly having a set of cooling conduits.

BACKGROUND

A gas turbine engine typically includes a turbomachine, with a fan in some implementations. The turbomachine generally includes a compressor, combustor, and turbine in serial flow arrangement. The compressor compresses air which is channeled to the combustor where it is mixed with fuel. The mixture is then ignited to generate hot combustion gases. The combustion gases are channeled to the turbine, which extracts energy from the combustion gases for pow-ering the compressor and fan, if used, as well as for producing useful work to propel an aircraft in flight or to power a load, such as an electrical generator.

During the operation of the gas turbine engine, various systems generate a relatively large amount of heat and stress. For example, a substantial amount of heat or stress can be generated during operation of the thrust generating systems, lubrication systems, electric motors and/or generators, hydraulic systems, or other systems. A design that mitigates heat loads and/or stresses on an engine component is advan-tageous.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 6A is a top cross-sectional view of the shank of the blade assembly of FIGS. 3-5 along a first plane of the multiple planes of FIG. 5.

FIG. 6B is a top cross-sectional view of the shank of the blade assembly of FIGS. 3-5 along a second plane of the multiple planes of FIG. 5.

FIG. 6C is a top cross-sectional view of the shank of the blade assembly of FIGS. 3-5 along a third plane of the multiple planes of FIG. 5.

FIG. 6D is a top cross-sectional view of the shank of the blade assembly of FIGS. 3-5 along a fourth plane of the multiple planes of FIG. 5.

FIG. 6E is a top cross-sectional view of the shank of the blade assembly of FIGS. 3-5 along a fifth plane of the multiple planes of FIG. 5.

FIG. 6F is a top cross-sectional view of the shank of the blade assembly of FIGS. 3-5 along a sixth plane of the multiple planes of FIG. 5.

FIG. 6G is a top cross-sectional view of the shank of the blade assembly of FIGS. 3-5 along a seventh plane of the multiple planes of FIG. 5

DETAILED DESCRIPTION

Figure 1:
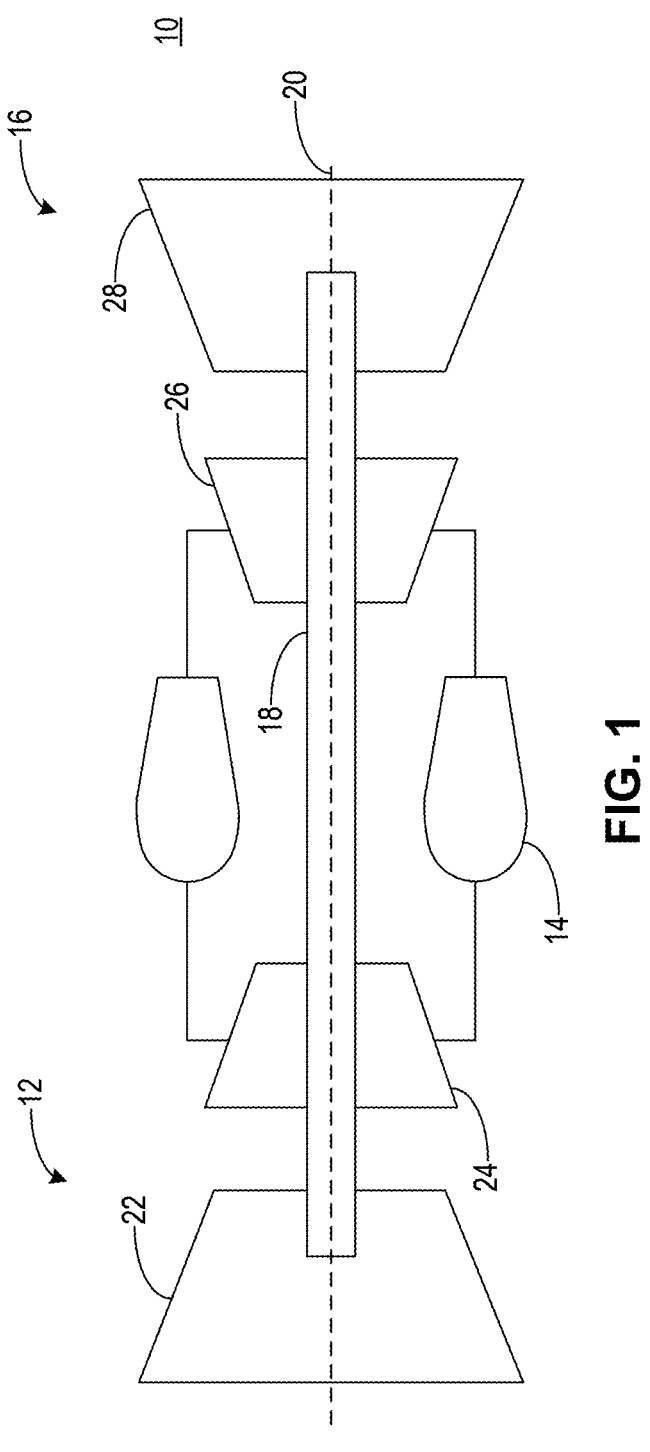
FIG. 1 is a schematic cross-sectional view of a gas turbine engine, in accordance with an exemplary embodiment of the present disclosure.

Reference will now be made in detail to present embodi-ments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to a blade assembly having conduits located within the blade assembly. Specifically, the blade assembly includes an airfoil with a plurality of cooling conduits and a shank with a plurality of inlet passages. The airfoil also includes cooling holes fluidly coupled to the plurality of cooling conduits within the airfoil.

The blade assembly may be in a turbine section of a gas turbine engine. For example, the blade assembly may be a stage one blade assembly of a high pressure turbine, which typically experiences the highest thermal and mechanical stresses.

The shank may be used to attach the blade assembly to a turbine disk. In some implementations, the shank is formed as a dovetail received in the turbine disk. A platform of the blade assembly together with other circumferentially arranged platforms and seals of other blade assemblies define a substantially continuous annular ring that limits (e.g., prevents, reduces) hot gas leakage from the flow path into the turbine disk cavity. The airfoil extends radially from the platform, away from the turbine disk while the shank extends radially from the platform, toward the turbine disk.

High engine temperatures and operational forces impart relatively large thermal and mechanical stresses on the blade assemblies. In addition, the cooling conduits and the inlet passages in the blade assembly result in stress redistribution (i.e., the cooling conduits and the inlet passages can act as stress risers, etc.). For example, the size of the cooling conduits and the inlet passages affects the thickness of the airfoil wall and the shank wall, which affects stress distri-bution in the blade assembly. Relatively large stresses can contribute to an unexpected or premature part replacement.

Therefore, there is a need for a blade assembly with greater durability to increase time on wing.

Connection references (e.g., attached, coupled, connected, and joined) are to be construed broadly and can include intermediate structural elements between a collection of elements and relative movement between elements unless otherwise indicated. As such, connection references do not necessarily infer those two elements are directly connected and in fixed relation to one another. The exemplary drawings are for purposes of illustration only and the dimensions, positions, order and relative sizes reflected in the drawings attached hereto can vary.

As used herein, a "stage" of either a compressor or a turbine of a gas turbine engine is a set of blade assemblies and an adjacent set of vane assemblies, with both sets of the blade assemblies and the vane assemblies circumferentially arranged about an engine centerline. A pair of circumferentially adjacent vanes in the set of vane assemblies are referred to as a nozzle. The blade assemblies rotate relative to the engine centerline. In one example, the blade assemblies are mounted to a rotating structure, such as a disk.

As used herein, the word "exemplary" means "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", and "fourth" can be used interchangeably to distinguish one component from another and are not intended to signify location or importance of the individual components.

As used herein, a "set" or a set of elements can include any number of said elements, including one.

As used herein, the terms "forward" and "aft" refer to relative positions within a gas turbine engine and refer to the normal operational attitude or direction of travel of the gas turbine engine. For example, with regard to a gas turbine engine, forward refers to a position relatively closer to the nose of an aircraft and aft refers to a position relatively closer to a tail of the aircraft.

As used herein, the terms "upstream" and "downstream" refer to a location along a fluid flowpath with respect to a direction of fluid flow along the fluid flow path and reference location along the fluid flowpath.

As used herein, the term "fluid" refers to a gas or a liquid and "fluidly coupled" means a fluid can flow between the coupled regions.

As used herein, forms "a", "an", and "the" include plural references unless the context clearly dictates otherwise.

As used herein, a radial direction (denoted "R") is a direction that is perpendicular to a base plane on a shank of a blade assembly.

As used herein, an axial direction (denoted "A") is a direction that is perpendicular to a shank leading-edge plane on the shank of the blade assembly and perpendicular to the radial direction.

As used herein, a tangential direction (denoted "T") is a direction that is perpendicular to the radial direction and the axial direction.

A stator rotor seal radius (denoted "SRSR") is a radius of curvature of an upper edge of a stator rotor seal on a blade assembly.

The term redline exhaust gas temperature (referred to herein as "redline EGT") refers to a maximum permitted takeoff temperature documented in a Federal Aviation Administration ("FAA")-type certificate data sheet. For example, in certain exemplary embodiments, the term redline EGT may refer to a maximum permitted takeoff temperature of an airflow after a first stage stator downstream of an HP turbine of an engine that the engine is rated to withstand. The term redline EGT is sometimes also referred to as an indicated turbine exhaust gas temperature or indicated turbine temperature.

The term redline core speed (referred to herein as "redline CS") refers to a maximum rotational speed of a gas turbine engine permitted at takeoff as documented in the FAA-type certificate data sheet. For example, the redline core speed CS is the rate at which the drive shaft for the gas turbine engine rotates, which defines the rotational speed of the particular blade assembly within the gas turbine engine.

As used herein "cooling conduit" refers to a flow path that conveys a cooling fluid that is formed in a blade assembly.

As used herein, a "cooling conduit portion" refers to a discrete portion of a cooling conduit at a cross-sectional plane of a blade assembly.

As used herein "inlet passage" refers to a cooling conduit formed in a shank of a blade assembly.

As used herein a "leading-edge inlet passage" refers to the inlet passage in a shank of a blade assembly that is adjacent to the leading edge of the blade assembly.

As used herein a "trailing-edge inlet passage" refers to the inlet passage in a shank of a blade assembly that is adjacent to the trailing edge of the blade assembly.

As used herein "a middle inlet passage" refers to an inlet passage that is between a leading-edge inlet passage and a trailing-edge inlet passage.

As used herein, "a base plane" of a blade assembly refers to the plane defined by the base of a shank of the blade assembly.

As used herein, a "second normalized area" (denoted "$\hat{A}_2$") refers to the ratio of (1) the cross-sectional area of the leading-edge inlet passage at a second plane spaced a radial distance of 0.0182 meters from a base plane of a blade assembly to (2) the cross-sectional area of the leading-edge inlet passage at a first plane spaced a radial distance of 0.0167 meters from the base plane.

As used herein, a "third normalized area" (denoted "$\hat{A}_3$") refers to the ratio of (1) the cross-sectional area of the leading-edge inlet passage at a third plane spaced a radial distance of 0.0212 meters from a base plane of a blade assembly to (2) the cross-sectional area of the leading-edge inlet passage at a first plane spaced a radial distance of 0.0167 meters from the base plane.

As used herein, a "fourth normalized area" (denoted "$\hat{A}_4$") refers to the ratio of (1) the cross-sectional area of the leading-edge inlet passage at a fourth plane spaced a radial distance of 0.0227 meters from a base plane of a blade assembly to (2) the cross-sectional area of the leading-edge inlet passage at a first plane spaced a radial distance of 0.0167 meters from the base plane.

As used herein, a "fifth normalized area" (denoted "$\hat{A}_5$") refers to the ratio of (1) the cross-sectional area of the leading-edge inlet passage at a fifth plane spaced a radial distance of 0.0277 meters from a base plane of a blade assembly to (2) the cross-sectional area of the leading-edge inlet passage at a first plane spaced a radial distance of 0.0167 meters from the base plane.

As used herein, a "sixth normalized area" (denoted "$\hat{A}_6$") refers to the ratio of (1) the cross-sectional area of the leading-edge inlet passage at a sixth plane spaced a radial distance of 0.0295 meters from a base plane of a blade assembly to (2) the cross-sectional area of the leading-edge inlet passage at a first plane spaced a radial distance of 0.0167 meters from the base plane.

As used herein, a "seventh normalized area" (denoted "$\hat{A}_7$") refers to the ratio of (1) the cross-sectional area of the leading-edge inlet passage at a seventh plane spaced a radial distance of 0.0341 meters from a base plane of a blade assembly to (2) the cross-sectional area of the leading-edge inlet passage at a first plane spaced a radial distance of 0.0167 meters from the base plane.

A suction side cross-sectional area (denoted "SSA") is an average of the sums of the cross-sectional area of three cooling conduits located along a suction side of an airfoil of a blade assembly taken at (1) an eighth plane spaced a radial distance of 0.0400 meters from a base plane of a blade assembly and (2) a ninth plane spaced a radial distance of 0.0476 meters from a base plane of a blade assembly.

All measurements referred to herein are taken of the blade assembly prior to use or as a cold component.

Referring now to the drawings, FIG. 1 is a schematic view of a gas turbine engine 10. As a non-limiting example, the gas turbine engine 10 can be used on an aircraft. The gas turbine engine 10 includes an engine core extending along an engine centerline 20 and including, at least, a compressor section 12, a combustor 14, and a turbine section 16 in serial flow arrangement. In some examples, the gas turbine engine 10 includes a fan (not shown) that is driven by the engine core to provide thrust and provides air to the compressor section 12. The gas turbine engine 10 includes a drive shaft 18 that rotationally couples the fan, compressor section 12, and turbine section 16, such that rotation of one affects the rotation of the others, and defines a rotational axis along the engine centerline 20 for the gas turbine engine 10.

In the illustrated example, the compressor section 12 includes a low-pressure (LP) compressor 22 and a high-pressure (HP) compressor 24 serially fluidly coupled to one another. The turbine section 16 includes a high-pressure (HP) turbine 26 and a low-pressure (LP) turbine 28 serially fluidly coupled to one another. The drive shaft 18 operatively couples the LP compressor 22, the HP compressor 24, the HP turbine 26 and the LP turbine 28 to one another. In some implementations, the drive shaft 18 includes an LP spool (not illustrated) and an HP spool (not illustrated), where the LP spool couples the LP compressor 22 to the LP turbine 28, and the HP spool couples the HP compressor 24 to the HP turbine 26.

The compressor section 12 includes a plurality of axially spaced stages. Each stage includes a set of circumferentially spaced rotating blade assemblies and a set of circumferentially-spaced stationary vane assemblies. In one configuration, the compressor blade assemblies for a stage of the compressor section 12 are mounted to a disk, which is mounted to the drive shaft 18. Each set of blade assemblies for a given stage can have its own disk. In one implementation, the vane assemblies of the compressor section 12 are mounted to a casing which extends circumferentially about the turbine engine 10. In a counter-rotating gas turbine engine, the vane assemblies are mounted to a drum, which is similar to the casing, except the drum rotates in a direction opposite the blade assemblies, whereas the casing is stationary. It will be appreciated that the representation of the compressor section 12 is merely schematic. The number of stages can vary.

Similar to the compressor section 12, the turbine section 16 includes a plurality of axially spaced stages, with each stage having a set of circumferentially spaced, rotating blade assemblies and a set of circumferentially-spaced, stationary vane assemblies. In one configuration, the turbine blade assemblies for a stage of the turbine section 16 are mounted to a disk which is mounted to the drive shaft 18. Each set of blade assemblies for a given stage can have its own disk. In one implementation, the vane assemblies of the turbine section are mounted to the casing in a circumferential manner.

The combustor 14 is provided serially between the compressor section 12 and the turbine section 16. The combustor 14 is fluidly coupled to at least a portion of the compressor section 12 and the turbine section 16 such that the combustor 14 at least partially fluidly couples the compressor section 12 to the turbine section 16. As a non-limiting example, the combustor 14 is fluidly coupled to the HP compressor 24 at an upstream end of the combustor 14 and to the HP turbine 26 at a downstream end of the combustor 14.

During operation of the gas turbine engine 10, ambient or atmospheric air is drawn into the compressor section 12 via the fan, upstream of the compressor section 12, where the air is compressed defining a pressurized air. The pressurized air then flows into the combustor 14 where the pressurized air is mixed with fuel and ignited, thereby generating hot combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the gas turbine engine 10 via an exhaust section (not illustrated) downstream of the turbine section 16. The LP turbine 28 drives the LP spool to rotate the fan and the LP compressor 22. The pressurized airflow and the combustion gases together define a working airflow that flows through the fan, compressor section 12, combustor 14, and turbine section 16 of the gas turbine engine 10.

Figure 2:
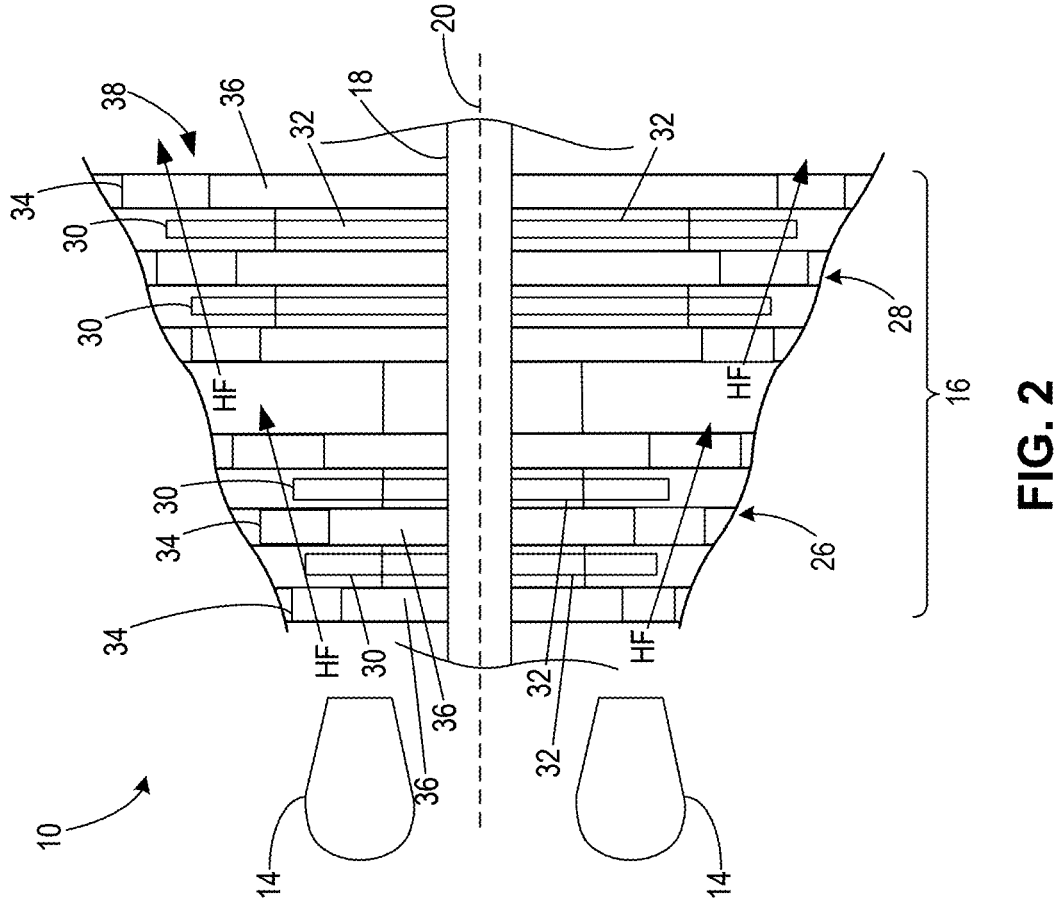
FIG. 2 is a schematic cross-sectional view of a turbine section of the gas turbine engine of FIG. 1, in accordance with an exemplary embodiment of the present disclosure.

Turning to FIG. 2, a portion of the turbine section 16 is schematically illustrated. The turbine section 16 includes sets of blade assemblies 30 circumferentially mounted to corresponding disks 32. The number of individual blade assemblies of the set of blade assemblies 30 mounted to each disk 32 may vary. While shown schematically in FIG. 2, it should be understood that the turbine section 16 can be a single stage turbine, or can include additional stages as shown.

Stationary vane assemblies 34 are mounted to a stator ring 36 located distally exterior of each of the disks 32. A nozzle 38 is defined by the space between circumferentially adjacent pairs of vane assemblies 34. The number of nozzles 38 provided on the stator ring 36 may vary.

During operation of the gas turbine engine 10, a flow of hot gas or heated fluid flow (denoted "HF") exits the combustor 14 and enters the turbine section 16. The heated fluid flow HF is directed through the nozzles 38 and impinges on the blade assemblies 30, which rotates the blade assemblies 30 circumferentially around the engine centerline 20 and causes rotation of the drive shaft 18. The engine core is configured to generate a redline exhaust gas temperature (EGT) in a range of 988 degrees Celsius (C) to 1120° C.

Figure 3:
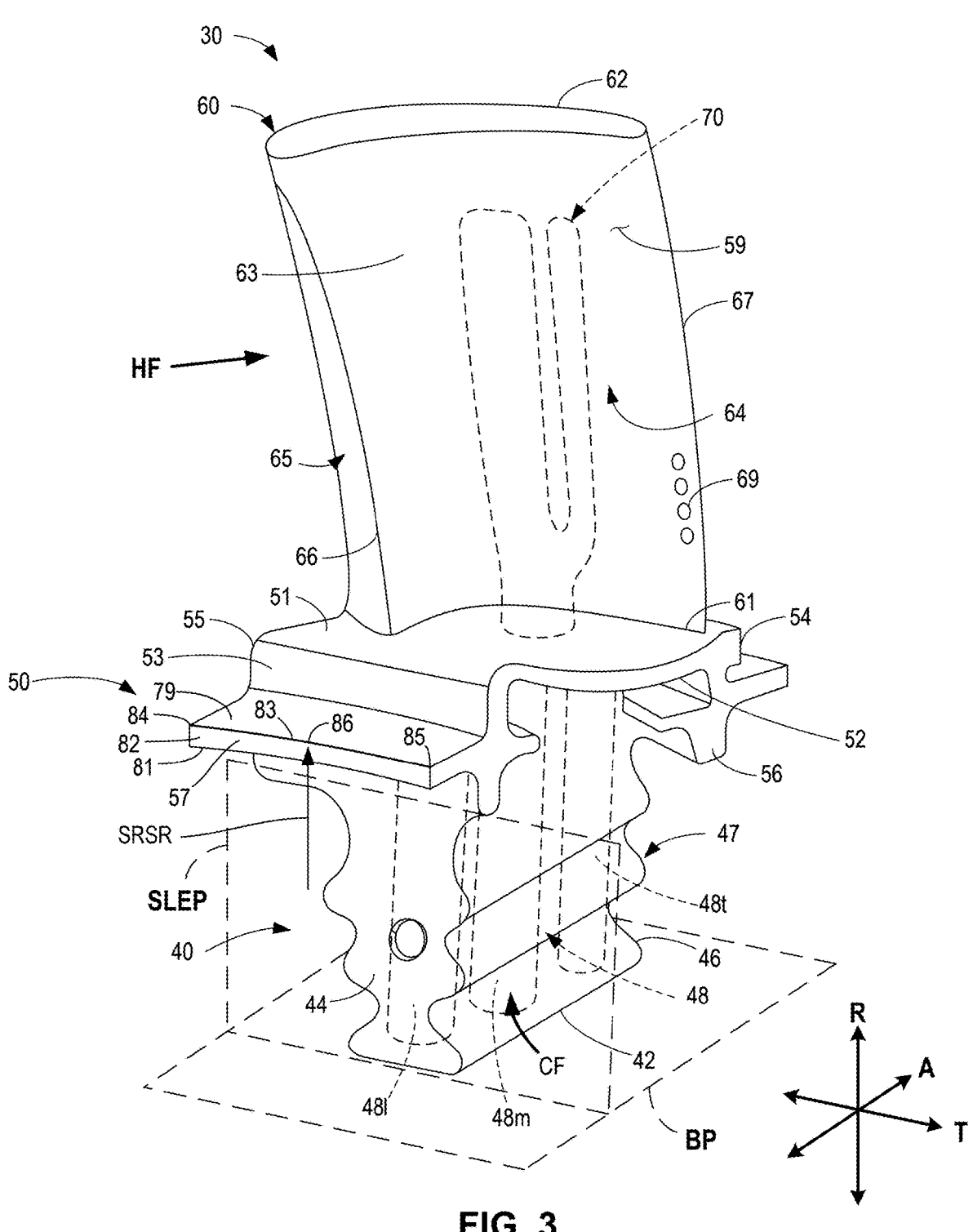
FIG. 3 is a perspective view of a blade assembly including a leading-edge inlet passage for use in the gas turbine engine of FIG. 1, in accordance with an exemplary embodiment of the present disclosure.

FIG. 3 is a perspective view of a single blade assembly 30 for the gas turbine engine 10 (FIG. 1). The blade assembly 30 may correspond to a stage one blade assembly of the HP turbine 26. The blade assembly 30 includes a shank 40, a platform 50, and an airfoil 60 (also referred to as a blade or blade portion). The blade assembly 30 can be constructed as a single unitary part or component (e.g., a monolithic structure). In other examples, the shank 40, the platform 50, and/or the airfoil 60 can be constructed as separate parts or components that are coupled together to form the blade assembly 30.

A directional reference system is illustrated in FIG. 3. The shank 40 extends between a base 42 and the platform 50. The base 42 of the shank 40 is a flat surface that defines a plane, referred to herein as the base plane (denoted "BP"). A radial direction (denoted "R") of the blade assembly 30 is a direction that is perpendicular to the base plane BP. Further, the shank 40 extends between a shank leading-edge 44 and a shank trailing edge 46. The shank leading-edge 44 is a flat surface that defines a plane, referred herein as the shank leading-edge plane (denoted "SLEP"). An axial direction (denoted "A") of the blade assembly 30 is a direction that is perpendicular to the shank leading-edge plane SLEP. A tangential direction (denoted "T") is a direction perpendicular to both the radial direction R and the axial direction A.

The shank 40 is configured, by way of non-limiting example as a dovetail 47, to mount to the disk 32 (FIG. 2) of the engine 10 to rotatably drive the blade assembly 30. The shank 40 includes a plurality of inlet passages 48 (shown in dashed lines) for receiving a cooling fluid (denoted "CF") (e.g., bleed air) to cool the blade assembly 30. In the illustrated example, the plurality of inlet passages 48 includes a leading-edge inlet passage 48*l*, a middle inlet passage 48*m*, and a trailing-edge inlet passage 48*t*. Each of the inlet passages 48*l*, 48*m*, 48*t* extends between the base 42 and one or more cooling conduits in the airfoil 60, disclosed in further detail herein. The inlet passages 48*l*, 48*m*, 48*t* receive the cooling fluid CF at the base 42. The cooling fluid CF flows through the inlet passages 48*l*, 48*m*, 48*t* and into the one or more cooling conduits in the airfoil 60. While in this example there are three inlet passages, in other examples, the shank 40 can include more or fewer inlet passages.

The airfoil 60 extends radially outward from the platform 50 to define a root 61, connected to the platform 50, and a tip 62 opposite the root 61. Additionally, the airfoil 60 includes an outer wall 63 defining an exterior surface 59 defining a pressure side 64 and a suction side 65 opposite the pressure side 64. The airfoil 60 extends between an airfoil leading-edge 66 and an airfoil trailing edge 67 downstream from the airfoil leading-edge 66. The airfoil leading-edge 66 and the airfoil trailing edge 67 separate the pressure side 64 from the suction side 65. In the illustrated example, the blade assembly 30 has a plurality of cooling conduits 70 (shown in dashed lines) formed within the airfoil 60. Further, the blade assembly 30 has one or more cooling holes 69 formed in the outer wall 63 of the airfoil 60 to fluidly couple the plurality of cooling conduits 70 within the airfoil 60 to an exterior of the blade assembly 30. In the illustrated example, the cooling holes 69 are near the airfoil trailing edge 67 along the pressure side 64. In other examples, the cooling holes 69 can be disposed in other locations. The plurality of cooling conduits 70 can include multiple conduits that extend radially through the airfoil 60. In some examples, one or more of the cooling conduits 70 are fluidly coupled to certain ones of the inlet passages 48*l*, 48*m*, 48*t*.

The platform 50 has a first surface 51, referred to as an upper surface, and a second surface 52, referred to as a lower surface, opposite the upper surface 51. The airfoil 60 is coupled to and extends radially outward from the upper surface 51, and the shank 40 is coupled to and extends radially inward from the lower surface 52. The platform 50 extends between a platform leading-edge 53 and a platform trailing edge 54, opposite the platform leading-edge 53, in the axial A direction. The platform 50 further extends between a first slashface 55 and a second slashface 56, opposite the first slashface 55, in the tangential T direction. When assembled, consecutive blade assemblies 30 are arranged in a circumferential direction about the engine centerline 20 (FIG. 1) with sequential slashfaces 55, 56 facing each other.

During operation of the gas turbine engine 10, the heated fluid flow HF flows along the blade assembly 30. The airfoil leading-edge 66 is defined by a stagnation point with respect to the heated fluid flow HF. The heated fluid flow HF flows generally in the axial direction, from forward to aft, while the local directionality can vary as the heated fluid flow HF is driven or turned within the gas turbine engine 10. The cooling fluid flow CF is fed to the plurality of inlet passages 48 and flows into the plurality of cooling conduits 70 to cool the airfoil 60. The cooling fluid flow CF is provided throughout the airfoil 60 and exhausted from the plurality of cooling conduits 70 via the cooling holes 69 as a cooling film. Multiple blade assemblies 30 are arranged circumferentially such that the platforms 50 of the blade assemblies 30 form a continuous ring. The platform 50 helps to radially contain the heated fluid flow HF to protect the disk 32. The platform 50 acts to seal the space radially inward of the platform 50 between the flow path of the heated fluid flow H and the disk 32 (FIG. 2). The disk 32 requires significant cooling to ensure the durability of the HP turbine 26 components.

Materials used to form the blade assembly 30 include, but are not limited to, steel, refractory metals such as titanium, or superalloys based on nickel, cobalt, or iron, ceramic matrix composites, or combinations thereof. The structures can be formed by a variety of methods, including additive manufacturing, casting, electroforming, or direct metal laser melting, in non-limiting examples.

As shown in FIG. 3, the platform 50 has a stator rotor seal 57 that extends axially forward from the platform leading-edge 53. The stator rotor seal 57 facilitates sealing of a forward buffer cavity (not shown) defined within the rotor assembly. The stator rotor seal 57 has an upper surface 79, a lower surface 81 opposite the upper surface 79, and a forward surface 82 between the upper surface 79 and the lower surface 81. The stator rotor seal 57 has an upper edge 83 between the upper surface 79 and the forward surface 82. The upper edge 83 is curved or arc-shaped. In particular, the upper edge 83 is curved between a first end point 84 at the first slashface 55 and a second end point 85 at the second slashface 56. The upper edge 83 of stator rotor seal 57 has a center point 86 that forms the peak of the arc. The upper edge 83 of the stator rotor seal 57 has a radius of curvature, referred to herein as a stator rotor seal radius (denoted "SRSR"). The center of the radius of curvature of the SRSR is the engine centerline 20 (FIG. 1).

Figure 4:
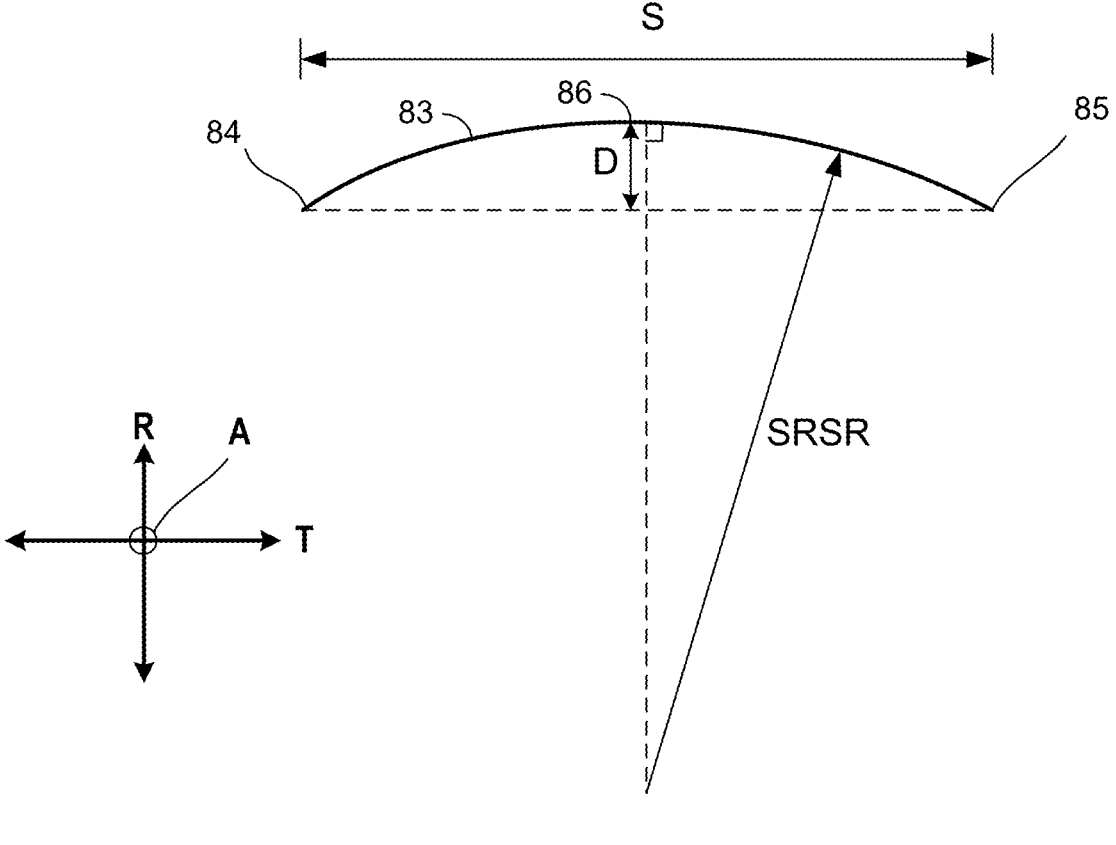
FIG. 4 is a schematic used to calculate a stator rotor seal radius of the blade assembly of FIG. 3.

As shown in FIG. 4, the SRSR (i.e., the radius of curvature of the upper edge 83 of the stator rotor seal 57) can be calculated using the straight-line distance(S) between the two the end points 84, 85, and the maximum deflection (D), in the radial R direction, between the two end points 84, 85 and the center point 86 of the arc. The SRSR can be calculated using $SRSR = (D/2) + (S^2/(8 \times D))$.

Figure 5:
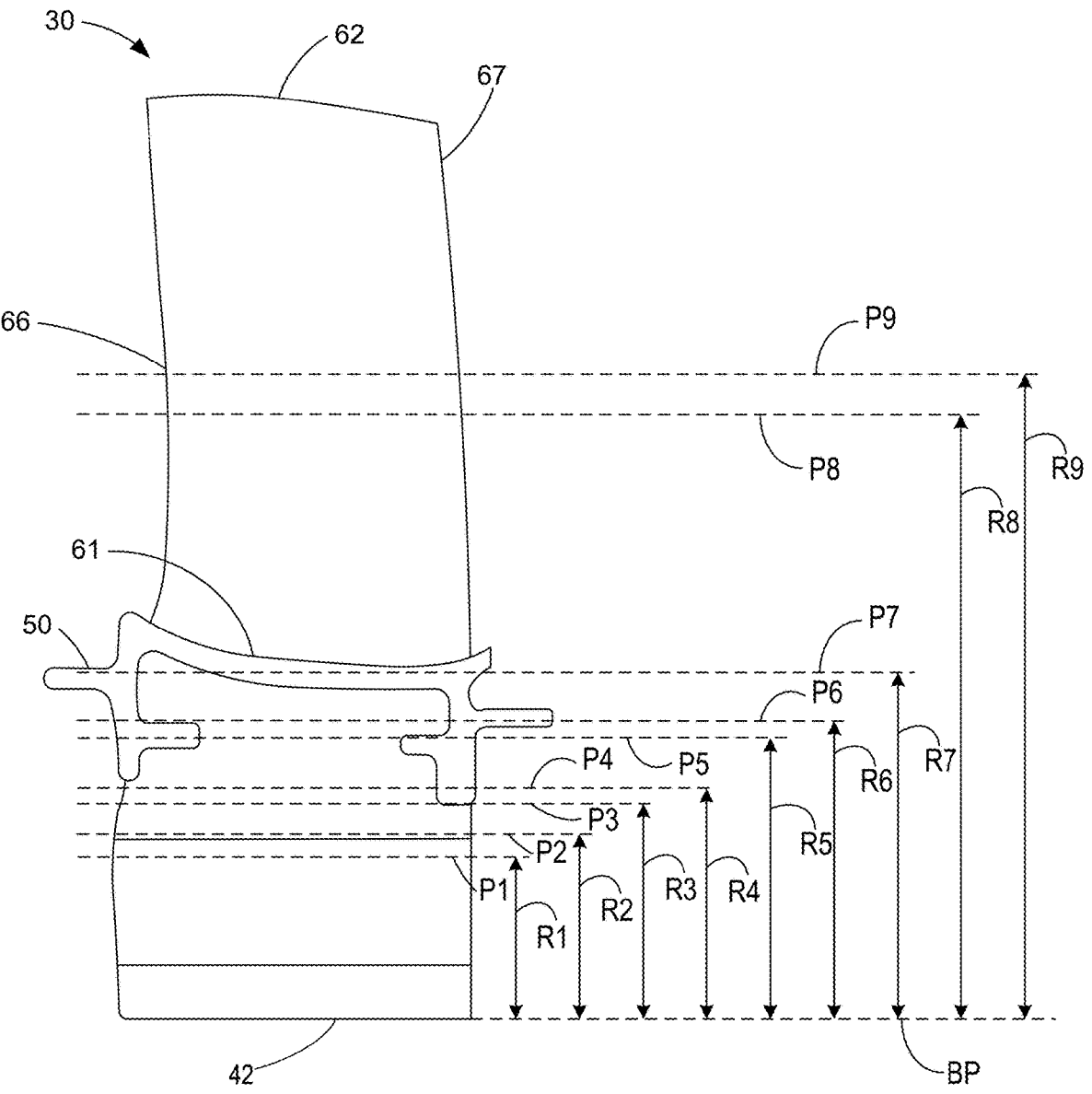
FIG. 5 is a side view of the blade assembly of FIG. 3 showing multiple planes, in accordance with an exemplary embodiment of the present disclosure.

FIG. 5 is a side view of the blade assembly 30. As disclosed above, the base plane BP is a plane defined by the base 42 and is perpendicular to the radial direction R. A first plane (denoted "P1") is parallel to the base plane BP and is located at a first radial distance (denoted "R1") from the base plane BP. A second plane (denoted "P2") is parallel to the base plane BP and is located at a second radial distance (denoted "R2") from the base plane BP. A third plane (denoted "P3") is parallel to the base plane BP and is located at a third radial distance (denoted "R3") from the base plane BP. A fourth plane (denoted "P4") is parallel to the base plane BP and is located at a fourth radial distance (denoted "R4") from the base plane. A fifth plane (denoted "P5") is parallel to the base plane BP and is located at a fifth radial distance (denoted "R5") from the base plane. A sixth plane (denoted "P6") is parallel to the base plane BP and is located at a sixth radial distance (denoted "R6") from the base plane. A seventh plane (denoted "P7") is parallel to the base plane BP and is located at a seventh radial distance (denoted "R7") from the base plane. An eighth plane (denoted "P8") is parallel to the base plane BP and is located at an eighth radial distance (denoted "R8") from the base plane. A ninth plane (denoted "P9") is parallel to the base plane BP and is located at a ninth radial distance (denoted "R9") from the base plane.

Each of the planes P1, P2, P3, P4, P5, P6, P7, P8, P9 extend perpendicular to the radial direction R. The first radial distance R1 is less than the second radial distance R2, which is less than the third radial distance R3, which is less than the fourth radial distance R4, which is less than the fifth radial distance, which is less than the sixth radial distance: R1<R2<R3<R4<R5<R6<R7<R8<R9. Table 1 includes the radial distances, R1, R2, R3, R4, R5, R6, R7, R8, R9 of the planes, P1, P2, P3, P4, P5, P6, P7, P8, P9 from the base plane, BP.

TABLE 1

| Plane | Radial Distance | Distance from Base Plane |
|---|---|---|
| P1 | R1 | 0.0167 meters |
| P2 | R2 | 0.0182 meters |
| P3 | R3 | 0.0212 meters |
| P4 | R4 | 0.0227 meters |
| P5 | R5 | 0.0277 meters |
| P6 | R6 | 0.0295 meters |
| P7 | R7 | 0.0341 meters |
| P8 | R8 | 0.0400 meters |
| P9 | R9 | 0.0476 meters |

The first plane P1, the second plane P2, the third plane P3, the fourth plane P4, the fifth plane P5, the sixth plane P6, and the seventh plane P7 extend through the shank 40. The eighth plane P8 and the ninth plane P9 extend through the airfoil 60. The platform 50, the root 61, the tip 62, the airfoil leading-edge 66, and the airfoil trailing-edge 67 are labeled in FIG. 5.

FIGS. 6A-8 depict a plurality of cross-sectional top views of the blade assembly 30 depicting the inlet passages 48*l*, 48*m*, 48*t* and the cooling conduits 70 along the planes P1-P9 of FIG. 5. It should be appreciated that the relative size(s) and shape(s) of the various portions of the blade assembly 30 and the cooling conduit in each of the views of FIGS. 6A-8 are not necessarily accurate and/or to scale. Additionally, portions of the cross-sectional views of FIGS. 6A-8 are depicted without cross-hatching and are bound by dashed lines. It should be appreciated that these portions can be solid and/or can contain other cooling conduits.

Figures 6A, 6B, 6C, 6D, 6E, 6F, 6G:
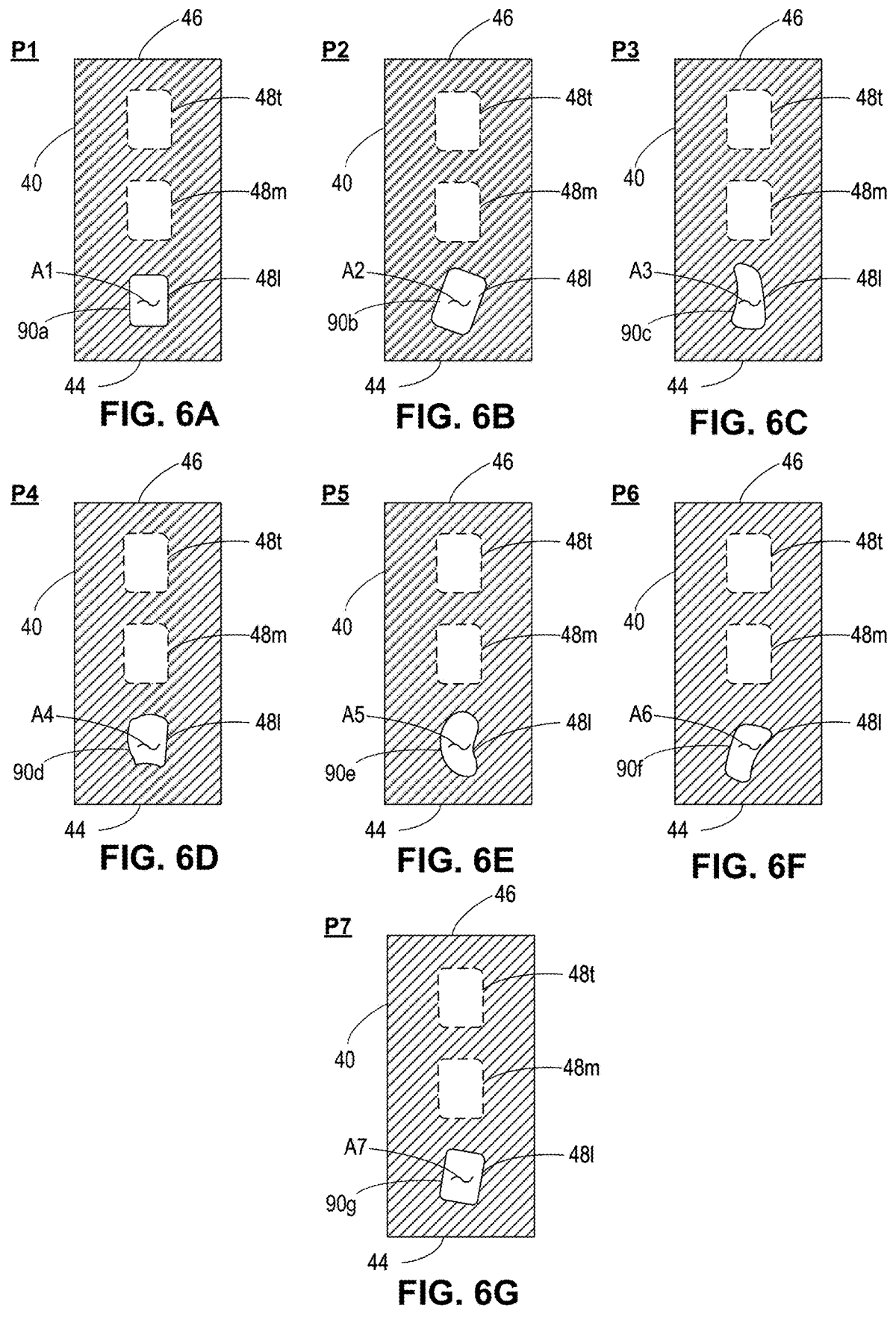

FIG. 6A is a cross-sectional top view of the shank 40 taken along the first plane P1 of FIG. 5, which is the first radial distance R1 from the base plane BP. The shank 40 includes the leading-edge inlet passage 48*l*, the middle inlet passage 48*m*, and the trailing edge inlet passage 48*t* within the shank 40. The plurality of inlet passages 48 extends through the shank 40 to provide internal fluid communication with the cooling conduits of the airfoil 60. In particular, the plurality of inlet passages 48 provide the cooling fluid flow CF (FIG. 3) to the cooling conduits 70 (FIG. 3). The leading-edge inlet passage 48*l* is the passage that is closest to the shank leading-edge 44. In the illustrated example the set of inlet passages 48 includes three inlet passages, but in other examples, it can include more or fewer passages. Within the first plane P1, the leading-edge inlet passage 48*l* defines a first cooling conduit portion 90*a* with a first cross-sectional area (denoted "$A_1$").

FIG. 6B is a cross-sectional top view of the shank 40 taken along the second plane P2 of FIG. 5. Within the second plane, the leading-edge inlet passage 48*l* defines a second cooling conduit portion 90*b* with a second cross-sectional area (denoted "$A_2$"). As used herein, the normalized second area (denoted "$\hat{A}_2$") refers to the ratio of the second cross-sectional area $A_2$ to the first cross-sectional area $A_1$. The normalized second area can be calculated by the following equation:

$$\hat{A}_2 = \frac{A_2}{A_1}$$

FIG. 6C is a cross-sectional top view of the shank 40 taken along the third plane P3 of FIG. 5. Within the third plane, the leading-edge inlet passage 48*l* defines a third cooling conduit portion 90*c* with a third cross-sectional area (denoted "$A_3$"). As used herein, the normalized third area (denoted "$\hat{A}_3$") refers to the ratio of the third cross-sectional area $A_3$ to the first cross-sectional area $A_1$. The normalized third area can be calculated by the following equation:

$$\hat{A}_3 = \frac{A_3}{A_1}$$

FIG. 6D is a cross-sectional top view of the shank 40 taken along the fourth plane P4 of FIG. 5. Within the fourth plane, the leading-edge inlet passage 48*l* defines a fourth cooling conduit portion 90*d* with a fourth cross-sectional area (denoted "$A_4$"). As used herein, the normalized fourth area (denoted "$\hat{A}_4$") refers to the ratio of the fourth cross-sectional area $A_4$ to the first cross-sectional area $A_1$. The normalized fourth area can be calculated by the following equation:

$$\hat{A}_4 = \frac{A_4}{A_1}$$

FIG. 6E is a cross-sectional top view of the shank 40 taken along the fifth plane P5 of FIG. 5 is illustrated. Within the fifth plane, the leading-edge inlet passage 48*l* defines a fifth cooling conduit portion 90*e* with a fifth cross-sectional area (denoted "$A_5$"). As used herein, the normalized fifth area (denoted "$\hat{A}_5$") refers to the ratio of the fifth cross-sectional area $A_5$ to the first cross-sectional area $A_1$. The normalized fifth area can be calculated by the following equation:

$$\hat{A}_5 = \frac{A_5}{A_1}$$

FIG. 6F is a cross-sectional top view of the shank 40 taken along the sixth plane P6 of FIG. 5. Within the sixth plane (P6), the leading-edge inlet passage 48*l* defines a sixth cooling conduit portion 90*f* with a sixth cross-sectional area (denoted "$A_6$"). As used herein, the normalized sixth area (denoted "$\hat{A}_6$") refers to the ratio of the sixth cross-sectional area $A_6$ to the first cross-sectional area $A_1$. The normalized sixth area can be calculated by the following equation:

$$\hat{A}_6 = \frac{A_6}{A_1}$$

FIG. 6G is a cross-sectional top view of the shank 40 taken along the seventh plane P7 of FIG. 5 is illustrated. Within the seventh plane (P7), the leading-edge inlet passage 48*l* defines a seventh cooling conduit portion 90*g* with a sixth cross-sectional area (denoted "$A_7$"). As used herein, the normalized seventh area (denoted "$\hat{A}_7$") refers to the ratio of the seventh cross-sectional area $A_7$ to the first cross-sectional area $A_1$. The normalized seventh area can be calculated by the following equation:

$$\hat{A}_7 = \frac{A_7}{A_1}$$

Figure 7:
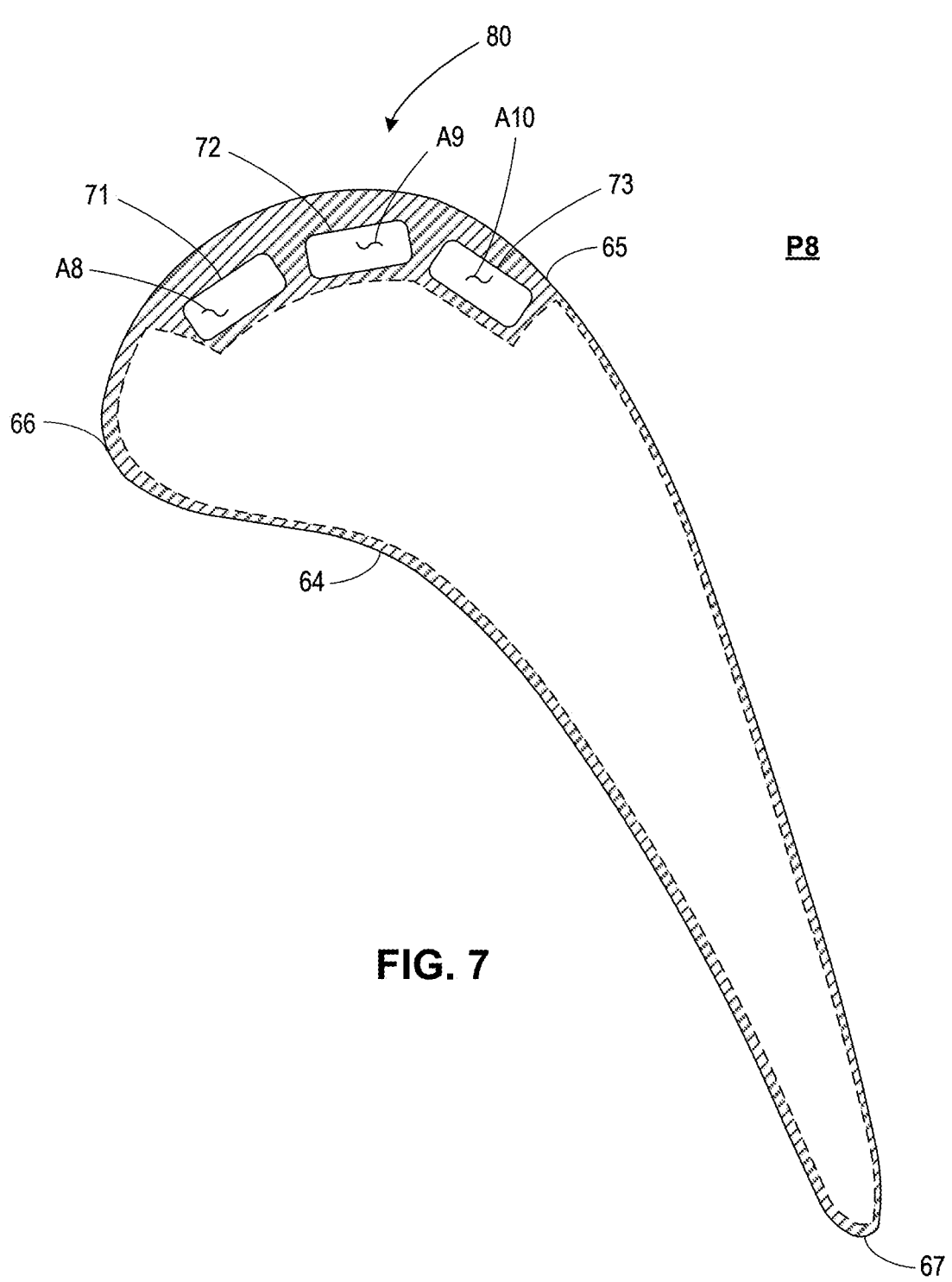
FIG. 7 is a top cross-sectional view of the airfoil of the blade assembly of FIGS. 3-5 along an eighth plane of the multiple planes of FIG. 5

FIG. 7 is a cross-sectional view of the airfoil 60 taken along the eighth plane P8 of FIG. 5. The airfoil 60 extends between the airfoil leading-edge 66 and the airfoil trailing-edge 67 to define the chord length CL therebetween. In FIG. 7, the plurality of cooling conduits 70 includes a first cooling conduit portion 71, a second cooling conduit portion 72, and a third cooling conduit portion 73, which define a group of suction side cooling conduits 80 proximate the suction side 65, and are numbered in order of closeness to the airfoil leading edge 66. In some examples, the airfoil 60 may include one or more additional cooling conduits closer to the trailing-edge 67.

Each of the cooling conduit portions 71, 72, 73 defines a cross-sectional area in the eighth plane P8. The first cooling conduit portion 71 has an eighth cross-sectional area (denoted "$A_8$"), the second cooling conduit portion 72 has a ninth cross-sectional area (denoted "$A_9$"), and the third cooling conduit portion 73 has a tenth cross-sectional area (denoted "$A_{10}$"). Together the eighth cross-sectional area, the ninth cross-sectional area, and the tenth cross-sectional area define a first sum (denoted "S1") of cross-sectional areas: $S1 = A_{10} + A_{11} + A_{12}$.

Figure 8:
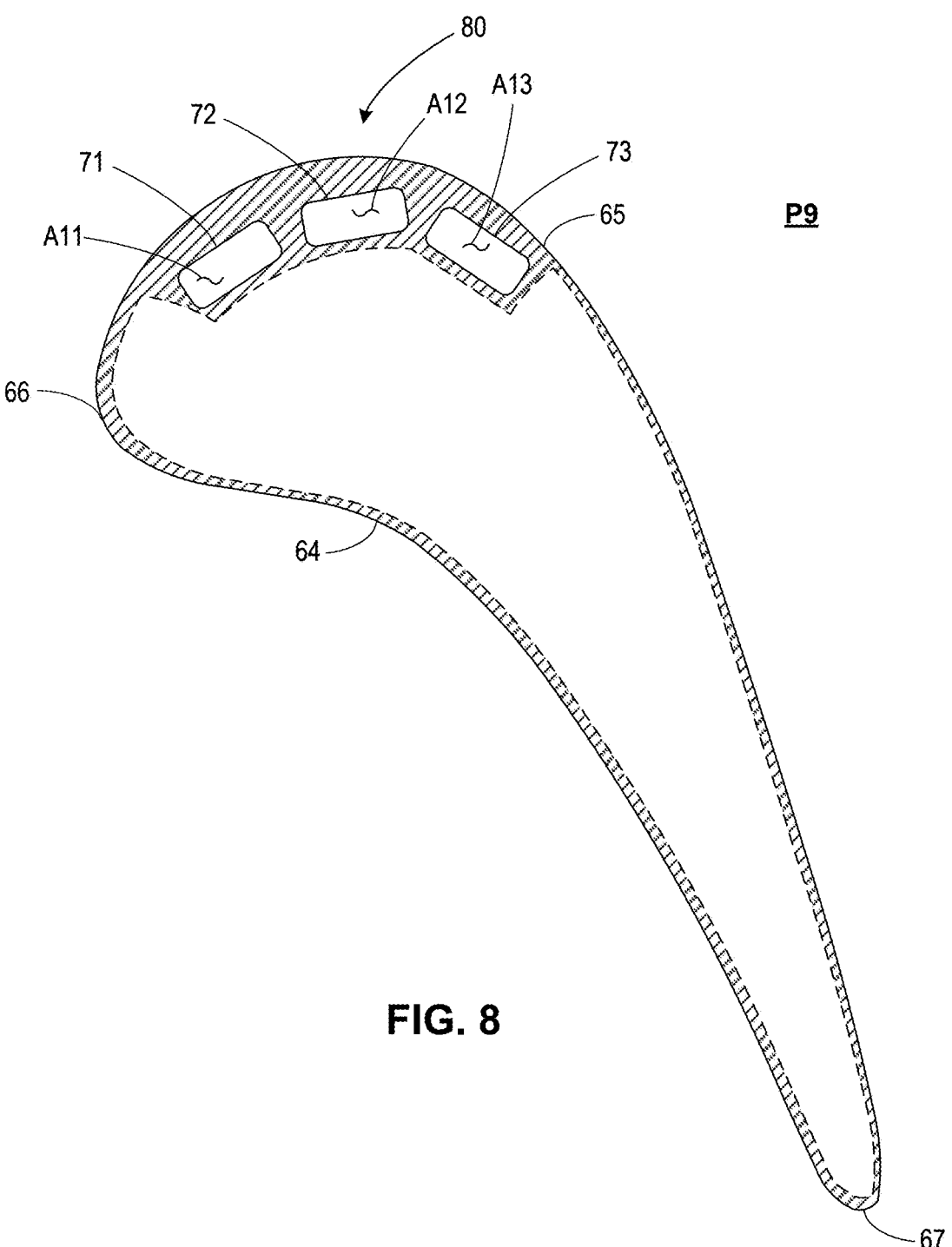
FIG. 8 is a top cross-sectional view of the airfoil of the blade assembly of FIGS. 3-5 along a ninth plane of the multiple planes of FIG. 5

FIG. 8 is a cross-sectional view of the airfoil 60 taken along the ninth plane P9 of FIG. 5, just above (radially outward of) the third plane P8. The first cooling conduit portion 71 has an eleventh cross-sectional area (denoted "$A_{11}$"), the second cooling conduit portion 72 has a twelfth cross-sectional area (denoted "$A_{12}$"), and the third cooling conduit portion 73 has a thirteenth cross-sectional area (denoted "$A_{13}$"). Together the eleventh cross-sectional area, the twelfth cross-sectional area, and the thirteenth cross-sectional area define a second sum (denoted "S2") of cross-sectional areas: $S2 = A_{11} + A_{12} + A_{13}$. As used herein, an average of the first and second sums S1 and S2 of the group of suction side cooling conduits 80 is referred to herein as the suction side area (denoted "SSA"). The SAA can be calculated by the following equation:

$$SSA = \frac{S1 + S2}{2}.$$

The blade assemblies 30 of the HP turbine 26 and, specifically, the stage one blade assemblies 30 of the HP turbine 26 have the highest flow path temperature of any blade set. These stage one blade assemblies also rotate at extremely high angular velocities. The extreme temperature environment and the high rotational speeds impart large forces on the stage one blade assemblies 30 that can lead to creep and fatigue, especially along the suction side of the airfoil. Creep and fatigue may result in an unexpected or premature part replacement that limits engine Time on Wing (TOW). Therefore, there is a need for a blade assembly with high durability that can withstand these large centrifugal stresses and reduce (e.g., minimize) creep and fatigue.

The inventors created blade assemblies with relatively high durability (e.g., creep and fatigue resistance) for a defined engine operating environment. The inventors developed multiple blade assembles and determined that it is beneficial to vary the geometries defining the cooling conduits by changing the conduit sizing proximate to the leading edge so as to locally increase wall thickness while remaining within the constraints of existing engine systems. Further geometry changes to the inlet passage enable control regarding the amount of cooling fluid provided to the cooling conduits. The blade assemblies disclosed herein include cooling conduits and inlet passages that are sized specifically to ensure adequate cooling capabilities while also improving creep and fatigue resistance.

The inventors determined that the sizing of the cooling conduits in the airfoil and the shank influenced creep and fatigue in the airfoil 60. More specifically, the normalized second area $\hat{A}_2$, the normalized third area $\hat{A}_3$, the normalized fourth area $\hat{A}_4$, the normalized fifth area $\hat{A}_5$, the normalized sixth area $\hat{A}_6$, the normalized seventh area $\hat{A}_7$, and the suction side area SSA for a specific set of operating characteristics.

The inventors determined during the course of their engine design, that the normalized second area $\hat{A}_2$, the normalized third area $\hat{A}_3$, the normalized fourth area $\hat{A}_4$, the normalized fifth area $\hat{A}_5$, the normalized sixth area $\hat{A}_6$, the normalized seventh area $\hat{A}_7$, and the suction side area SSA, along with the redline EGT and the redline CS provide engine designs with improved creep and fatigue resistance for the blade assembly 30. Specifically, the inventors determined that the relative sizes of the leading-edge passage 48*l* in the shank and an average of the first and second sums S1 and S2 of the group of suction side cooling conduits 80 in conjunction with specific engine operating conditions characterized by the redline EGT and the redline CS have a significant effect on durability. Decreasing the suction side area SSA increases a local thickness of the outer wall 63, thus improving load-bearing capability of the airfoil 60.

Table 2 below illustrates fourteen examples (denoted Ex. 1-14) of gas turbine engines 10 and blade assemblies 30 developed by the inventors. As stated above, the inventors created solutions (examples 1-10 of Table 2) with relatively high blade durability (e.g., reduced creep and fatigue, absence of crack initiation or propagation after a number of engine cycles) for a defined engine environment when compared to solutions without such high blade durability (examples 11-14 of Table 2). Table 2 includes the normalized second area $\hat{A}_2$, the normalized third area $\hat{A}_3$, the normalized fourth area $\hat{A}_4$, the normalized fifth area $\hat{A}_5$, the normalized sixth area $\hat{A}_6$, the normalized seventh area $\hat{A}_7$, and the suction side area SSA, the redline EGT, and the redline CS for each of the examples.

TABLE 2

| Parameter Units | $\hat{A}_2$ — | $\hat{A}_3$ — | $\hat{A}_4$ — | $\hat{A}_5$ — | $\hat{A}_6$ — | $\hat{A}_7$ — | SSA Square meters (m²) | Redline EGT Degrees Celsius (° C.) | Redline CS Hertz (Hz) |
|---|---|---|---|---|---|---|---|---|---|
| Ex. 1 | 0.996 | 1.485 | 1.861 | 1.262 | 1.039 | 1.078 | 0.00000945 | 988 | 306 |
| Ex. 2 | 1.139 | 1.620 | 1.743 | 1.155 | 1.179 | 0.890 | 0.00000500 | 1120 | 353 |
| Ex. 3 | 1.008 | 1.545 | 1.833 | 1.218 | 1.081 | 0.930 | 0.00000824 | 1032.484 | 311.406 |
| Ex. 4 | 1.028 | 1.532 | 1.781 | 1.256 | 1.042 | 0.916 | 0.00000850 | 1038.080 | 328.656 |
| Ex. 5 | 1.036 | 1.575 | 1.815 | 1.184 | 1.133 | 0.954 | 0.00000802 | 1005.977 | 331.081 |
| Ex. 6 | 1.033 | 1.547 | 1.799 | 1.244 | 1.056 | 1.078 | 0.00000736 | 1087.621 | 321.331 |
| Ex. 7 | 1.087 | 1.503 | 1.777 | 1.187 | 1.139 | 0.996 | 0.00000885 | 1071.975 | 336.793 |
| Ex. 8 | 1.123 | 1.570 | 1.761 | 1.206 | 1.065 | 1.020 | 0.00000825 | 1055.089 | 309.475 |
| Ex. 9 | 1.015 | 1.520 | 1.808 | 1.235 | 1.095 | 1.022 | 0.00000851 | 1012.463 | 334.644 |
| Ex. 10 | 1.089 | 1.543 | 1.763 | 1.231 | 1.068 | 0.910 | 0.00000836 | 1090.943 | 322.475 |
| Ex. 11 | 1.004 | 1.177 | 1.294 | 0.981 | 0.919 | 1.136 | 0.00000999 | 988.648 | 324.083 |
| Ex. 12 | 1.004 | 1.156 | 1.298 | 1.011 | 0.928 | 1.145 | 0.00001071 | 1000.059 | 349.429 |
| Ex. 13 | 1.013 | 1.146 | 1.269 | 1.010 | 0.950 | 1.145 | 0.00001052 | 1077.402 | 332.813 |
| Ex. 14 | 1.010 | 1.164 | 1.239 | 0.998 | 0.892 | 1.145 | 0.00001128 | 995.487 | 326.062 |

The inventors found that blade assembly designs with parameters defined in Examples 1-10 exhibit relatively high structural integrity and durability while remaining within current engine constraints. Conversely, Examples 11-14 have relatively low durability for the particular engine environment.

The examples developed by the inventors shown in Table 1 can be characterized by an Expression (EQ) that can be used to distinguish those designs in Examples 1-10 that meet the performance (durability) requirements from those designs in Examples 11-14 that do not meet the performance requirements. As such, the Expression (EQ) can be used to identify an improved blade assembly design, better suited for a particular engine operating environment and taking into account the constraints imposed on blade assembly design with cooling holes used in such a system.

The Expression (EQ) is defined as:

$$EQ = \left(\frac{71}{100,000}\right) * \left(\frac{\hat{A}_2 + \hat{A}_6}{\hat{A}_7}\right)^3 *$$

$$\left(\frac{\hat{A}_4}{\hat{A}_5}\right)^{\hat{A}_3} * \left(\frac{0.005\,\text{m}^2}{SSA\,(\text{m}^2)}\right) * \left(\frac{EGT(^\circ\text{C.})}{221(^\circ\text{C.})}\right) * \left(\frac{N(\text{Hz})}{300\,\text{Hz}}\right)^2,$$

in which $\hat{A}_2$ represents the area of the leading edge passage 48l at the second plane P2 of FIG. 6B normalized by the area of the leading edge passage 48l at the first plane P1 of FIG. 6A. $\hat{A}_3$ represents the area of the leading edge passage 48l at the third plane P3 of FIG. 6C normalized by the area of the leading edge passage 48l at the first plane P1 of FIG. 6A. $\hat{A}_4$ represents the area of the leading edge passage 48l at the fourth plane P4 of FIG. 6D normalized by the area of the leading edge passage 48l at the first plane P1 of FIG. 6A. $\hat{A}_5$ represents the area of the leading edge passage 48l at the fifth plane P5 of FIG. 6E normalized by the area of the leading edge passage 48l at the first plane P1 of FIG. 6A. $\hat{A}_6$ represents the area of the leading edge passage 48l at the sixth plane P6 of FIG. 6F normalized by the area of the leading edge passage 48l at the first plane P1 of FIG. 6A. $\hat{A}_7$ represents the area of the leading edge passage 48l at the seventh plane P7 of FIG. 6G normalized by the area of the leading edge passage 48l at the first plane P1 of FIG. 6A. SSA represents the average of the sum of the areas of the cooling conduit portions 71, 72, 73 of FIGS. 7 and 8 at eighth plane P8 and the ninth plane P9. Redline EGT represents the redline exhaust gas temperature, or the maximum operating temperature for the gas turbine engine 10 measured at a particular location within the gas turbine engine 10. Redline CS represents the redline core speed of the engine and in turn the rotational speed of the blade assembly 30, measured in units of Hertz. The redline core speed CS can differ based on engine design limits and operational parameters.

Values for the Expression (EQ) for each of the examples of Table 2 are shown in Table 3.

TABLE 3

| Parameter Units | $\hat{A}_2$ — | $\hat{A}_3$ — | $\hat{A}_4$ — | $\hat{A}_5$ — | $\hat{A}_6$ — | $\hat{A}_7$ — | SSA Square meters (m²) | Redline EGT Degrees Celsius (° C.) | Redline CS Hertz (Hz) | EQ — |
|---|---|---|---|---|---|---|---|---|---|---|
| Ex. 1 | 0.996 | 1.485 | 1.861 | 1.262 | 1.039 | 1.078 | 0.00000945 | 988 | 306 | 20.927 |
| Ex. 2 | 1.139 | 1.620 | 1.743 | 1.155 | 1.179 | 0.890 | 0.00000500 | 1120 | 353 | 171.427 |
| Ex. 3 | 1.008 | 1.545 | 1.833 | 1.218 | 1.081 | 0.930 | 0.00000824 | 1032.484 | 311.406 | 46.220 |
| Ex. 4 | 1.028 | 1.532 | 1.781 | 1.256 | 1.042 | 0.916 | 0.00000850 | 1038.080 | 328.656 | 46.396 |
| Ex. 5 | 1.036 | 1.575 | 1.815 | 1.184 | 1.133 | 0.954 | 0.00000802 | 1005.977 | 331.081 | 56.521 |
| Ex. 6 | 1.033 | 1.547 | 1.799 | 1.244 | 1.056 | 1.078 | 0.00000736 | 1087.621 | 321.331 | 35.067 |
| Ex. 7 | 1.087 | 1.503 | 1.777 | 1.187 | 1.139 | 0.996 | 0.00000885 | 1071.975 | 336.793 | 50.204 |
| Ex. 8 | 1.123 | 1.570 | 1.761 | 1.206 | 1.065 | 1.020 | 0.00000825 | 1055.089 | 309.475 | 39.097 |
| Ex. 9 | 1.015 | 1.520 | 1.808 | 1.235 | 1.095 | 1.022 | 0.00000851 | 1012.463 | 334.644 | 37.352 |
| Ex. 10 | 1.089 | 1.543 | 1.763 | 1.231 | 1.068 | 0.910 | 0.00000836 | 1090.943 | 322.475 | 56.144 |
| Ex. 11 | 1.004 | 1.177 | 1.294 | 0.981 | 0.919 | 1.136 | 0.00000999 | 988.648 | 324.083 | 12.466 |
| Ex. 12 | 1.004 | 1.156 | 1.298 | 1.011 | 0.928 | 1.145 | 0.00001071 | 1000.059 | 349.429 | 13.050 |

TABLE 3-continued

| Parameter Units | $\hat{A}_2$ — | $\hat{A}_3$ — | $\hat{A}_4$ — | $\hat{A}_5$ — | $\hat{A}_6$ — | $\hat{A}_7$ — | SSA Square meters (m²) | Redline EGT Degrees Celsius (° C.) | Redline CS Hertz (Hz) | EQ — |
|---|---|---|---|---|---|---|---|---|---|---|
| Ex. 13 | 1.013 | 1.146 | 1.269 | 1.010 | 0.950 | 1.145 | 0.00001052 | 1077.402 | 332.813 | 13.253 |
| Ex. 14 | 1.010 | 1.164 | 1.239 | 0.998 | 0.892 | 1.145 | 0.00001128 | 995.487 | 326.062 | 9.874 |

Based on the Expression (EQ) values of Examples 1-10 in Table 3, it was determined that gas turbine engine and blade assembly designs with an EQ value in the range of 20.927 to 171.427 (i.e., 20.927≤EQ≤171.427) advantageously meet the durability requirements while remaining within desired tolerances and being capable of use in existing engine systems.

Benefits are realized when the manufactured component including the blade assembly 30 has a geometry where Expression (EQ) falls within the range 20.927 to 171.427 (i.e., 20.927≤EQ≤171.427). Such benefits include a reduction in stress at the suction side 65 of the airfoil 60, which increases the lifetime of the blade assembly 30 and therefore extends the time between a need for replacement parts. This provides for increased durability for the blade assembly 30, which decreases required maintenance and costs, while increasing overall engine reliability.

Further still, the benefits included herein provide for a blade assembly 30 that fits within existing engines. For example, the values for Expression (EQ) as provided herein take existing engines into consideration, permitting replacement of current blade assemblies with replacement blade assemblies (or new blade assemblies) having the parameters of the blade assembly 30 described herein. Such consideration provides for replacing and improving current engine systems without requiring the creation of new engine parts capable of holding the blade assembly 30. This provides for improving current engine durability without increasing costs to prepare new engines or further adapt existing engines.

Table 4 below illustrates the minimum and maximum values for the normalized second area $\hat{A}_2$, the normalized third area $\hat{A}_3$, the normalized fourth area $\hat{A}_4$, the normalized fifth area $\hat{A}_5$, the normalized sixth area $\hat{A}_6$, the normalized seventh area $\hat{A}_7$, the suction side area SSA, the redline exhaust gas temperature EGT, and the redline core speed CS along with a range of values for Expression (EQ) suited for a blade assembly that meets the durability requirements.

Additional benefits associated with the blade assembly 30 with the cooling conduits 71, 72, 73 and the leading edge passage 48l described herein include a quick assessment of design parameters in terms of blade assembly size and cooling conduit geometry, engine operational conditions, and blade assembly and vane assembly numbers for engine design and particular blade assembly design. Narrowing these multiple factors to a region of possibilities saves time, money, and resources. The blade assembly 30 with the cooling conduits 71, 72, 73 and leading-edge passage 48l described herein enables the development and production of high-performance turbine engines and blades across multiple performance metrics within a given set of constraints.

As noted above, designs such as Examples 11-14 of Tables 2 and 3 were found to have relatively low durability for a particular engine environment. This is reflected in the associated Expression (EQ) value outside the range of 20.927 to 171.427. Lower durability results in less time on wing (TOW) and greater maintenance costs.

Additionally or alternatively, designs outside the range of EQ may attempt to increase durability by making sacrifices in terms of weight, aerodynamic performance, and efficiency. For example, the standard practice for solving the problem of improving blade assembly durability has been to utilize stronger material. However, such materials lead to increased costs, system weight, and overall space occupied by the blade assembly. With a material-driven solution, the overall engine efficiency may be reduced and related components may have to be redesigned to compensate for the stronger materials. In some cases, the result of such a redesign is impractical or impossible. Therefore, a solution for reducing stresses located in airfoils presently used in existing engines is needed, without requiring the redesign of related components or without sacrificing overall engine efficiency.

In other examples, increasing the size of the airfoil or related components, utilizing stronger material, and/or pro-

TABLE 4

| Parameter: | Engine Element: | Minimum: | Maximum: | Units: |
|---|---|---|---|---|
| $\hat{A}_2$ | Normalized second area | 0.996 | 1.139 | dimensionless |
| $\hat{A}_3$ | Normalized third area | 1.485 | 1.620 | dimensionless |
| $\hat{A}_4$ | Normalized fourth area | 1.743 | 1.861 | dimensionless |
| $\hat{A}_5$ | Normalized fifth area | 1.155 | 1.262 | dimensionless |
| $\hat{A}_6$ | Normalized sixth area | 1.039 | 1.179 | dimensionless |
| $\hat{A}_7$ | Normalized seventh area | 0.890 | 1.078 | dimensionless |
| SSA | Suction Side Area | 0.00000500 | 0.00000945 | Square meters (m²) |
| EGT | Exhaust Gas Temperature | 988 | 1120 | Degrees Celsius (° C.) |
| CS | Core Speed | 306 | 353 | Hertz (Hz) |
| EQ | Expression | 20.927 | 171.427 | dimensionless | viding additional cooling features can combat centrifugal and thermal stresses. However, such increased size, stronger materials, and additional cooling features can lead to increased costs, system weight, overall space occupied by the blade assembly, and performance loss (e.g., higher specific fuel consumption, etc.), as well as increased local stresses at the cooling conduits due to increased weight and size relating to the centrifugal forces. Increased cooling features result in a relatively less amount of material utilized, which can result in an increase in local stresses at the cooling conduits. Therefore, a solution for reducing stress(es) at the cooling conduits is needed without otherwise increasing stress(es), weight, size, or decreasing engine efficiency.

As disclosed above, the inventors have found that the Examples 1-10 of Tables 2 and 3 provide successful solutions without the need to increase weight, strength, or the number of cooling features. The Examples 1-10 of Tables 2 and 3 illustrate that designs having an Expression (EQ) value from the range 20.927 to 171.427 (i.e., $20.927 \leq EQ \leq 171.427$) achieve increased durability without penalties to size, weight, strength, or stress through the use of additional cooling features. In other words, rather than using heavier, stronger materials, or adding additional cooling features, effective stress reduction can be achieved by the Examples 1-10 of Tables 2 and 3.

As disclosed above, the inventors created blade assemblies with relatively high durability (e.g., creep and fatigue resistance) for a defined engine operating environment.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A gas turbine engine, comprising an engine core configured to generate a redline exhaust gas temperature (EGT) in a range of 988 Celsius (° C.) to 1120° C. and having a redline core speed (CS) in a range of 306 Hertz to 353 Hertz, the engine core extending along an engine centerline and including a compressor section, a combustor, and a turbine section, the turbine section including a blade assembly rotatable about the engine centerline, the blade assembly comprising a platform having an upper surface and a lower surface, an airfoil extending from the upper surface of the platform, the airfoil having an exterior surface, the exterior surface defining a pressure side and a suction side, the airfoil including a leading-edge and a trailing-edge, a shank extending from the lower surface, the shank having a base defining a base plane, a leading-edge inlet passage located within the shank, the leading-edge inlet passage having a first cross-sectional area at a first plane, the first plane radially spaced 0.0167 meters from the base plane, a second cross-sectional area at a second plane, the second plane radially spaced 0.0182 meters from the base plane, a first ratio of the second cross-sectional area and the first cross-sectional area defining a second normalized area ($\hat{A}_2$) in a range of 0.996 to 1.139, a third cross-sectional area at a third plane, the third plane radially spaced 0.0212 meters from the base plane, a second ratio of the third cross-sectional area and the first cross-sectional area defining a third normalized area ($\hat{A}_3$) in a range of 1.485 to 1.620, a fourth cross-sectional area at a fourth plane, the fourth plane radially spaced 0.0226 meters from the base plane, a third ratio of the fourth cross-sectional area and the first cross-sectional area defining a fourth normalized area ($\hat{A}_4$) in a range of 1.743 to 1.861, a fifth cross-sectional area at a fifth plane, the fifth plane radially spaced 0.0277 meters from the base plane, a fourth ratio of the fifth cross-sectional area and the first cross-sectional area defining a fifth normalized area ($\hat{A}_5$) in a range of 1.155 to 1.262, a sixth cross-sectional area at a sixth plane, the sixth plane radially spaced 0.0294 meters from the base plane, a seventh ratio of the sixth cross-sectional area and the first cross-sectional area defining a sixth normalized area ($\hat{A}_6$) in a range of 1.039 to 1.179, and a seventh cross-sectional area at a seventh plane, the seventh plane radially spaced 0.0341 meters from the base plane, a sixth ratio of the seventh cross-sectional area and the first cross-sectional area defining a seventh normalized area ($\hat{A}_7$) in a range of 0.89 to 1.078, and a plurality of cooling conduits located within the airfoil, the plurality of cooling conduits including a group of suction side cooling conduits proximate to the suction side, the group of suction side cooling conduits having a first sum of areas at an eighth plane radially spaced 0.0400 meters from the base plane, the group of suction side cooling conduits having a second sum of areas at an nineth plane radially spaced 0.0476 meters from the base plane, an average of the first sum and the second sum defining a suction side cross-sectional area (SSA), wherein the suction side cross-sectional area (SSA) is from 0.000005 m² to 0.00000945 m², and wherein, $$20.927 \leq \left(\frac{71}{100,000}\right) * \left(\frac{\hat{A}_2 + \hat{A}_6}{\hat{A}_7}\right)^3 *$$
$$\left(\frac{\hat{A}_4}{\hat{A}_5}\right)^{4_3} * \left(\frac{0.005 \text{ m}^2}{SSA\,(\text{m}^2)}\right) * \left(\frac{EGT(^\circ\text{C.})}{221(^\circ\text{C.})}\right) * \left(\frac{N(\text{Hz})}{300\,\text{Hz}}\right)^2 \leq 171.427.$$

The gas turbine engine of any preceding clause, further including a plurality of inlet passages located within the shank, the plurality of inlet passages including the leading-edge inlet passage.

The gas turbine engine of any preceding clause, wherein each of the inlet passages extends between the base and one or more of the plurality of cooling conduits.

The gas turbine engine of any preceding clause, wherein the plurality of inlet passages further includes a middle inlet passage and a trailing-edge inlet passage.

The gas turbine engine of any preceding clause, wherein the shank is configured as a dovetail.

The gas turbine engine of any preceding clause, wherein the blade assembly is a stage one blade assembly of a high-pressure turbine of the turbine section.

The gas turbine engine of any preceding clause, wherein the first cross-sectional area is approximately equal to the seventh cross-sectional area.

A blade assembly for a gas turbine engine having an engine core configured to generate a redline exhaust gas temperature (EGT) in a range of 988 Celsius (° C.) to 1120° C. and having a redline core speed (CS) in a range of 306 Hertz to 353 Hertz, the blade assembly to be connected to the engine core and rotatable about an engine centerline of the engine core, the blade assembly comprising a platform having an upper surface and a lower surface, an airfoil extending from the upper surface of the platform, the airfoil having an exterior surface, the exterior surface defining a pressure side and a suction side, the airfoil including a leading edge and a trailing edge, a shank extending from the lower surface, the shank having a base defining a base plane, a leading-edge inlet passage located within the shank, the leading-edge inlet passage having a first cross-sectional area at a first plane, the first plane radially spaced 0.0167 meters from the base plane, a second cross-sectional area at a second plane, the second plane radially spaced 0.0182 meters from the base plane, a first ratio of the second cross-sectional area and the first cross-sectional area defining a second normalized area ($\hat{A}_2$) in a range of 0.996 to 1.139, a third cross-sectional area at a third plane, the third plane radially spaced 0.0212 meters from the base plane, a second ratio of the third cross-sectional area and the first cross-sectional area defining a third normalized area ($\hat{A}_3$) in a range of 1.485 to 1.620, a fourth cross-sectional area at a fourth plane, the fourth plane radially spaced 0.0226 meters from the base plane, a third ratio of the fourth cross-sectional area and the first cross-sectional area defining a fourth normalized area ($\hat{A}_4$) in a range of 1.743 to 1.861, a fifth cross-sectional area at a fifth plane, the fifth plane radially spaced 0.0277 meters from the base plane, a fourth ratio of the fifth cross-sectional area and the first cross-sectional area defining a fifth normalized area ($\hat{A}_5$) in a range of 1.155 to 1.262, a sixth cross-sectional area at a sixth plane, the sixth plane radially spaced 0.0294 meters from the base plane, a seventh ratio of the sixth cross-sectional area and the first cross-sectional area defining a sixth normalized area ($\hat{A}_6$) in a range of 1.039 to 1.179, and a seventh cross-sectional area at a seventh plane, the seventh plane radially spaced 0.0341 meters from the base plane, a sixth ratio of the seventh cross-sectional area and the first cross-sectional area defining a seventh normalized area ($\hat{A}_7$) in a range of 0.89 to 1.078, and a plurality of cooling conduits located within the airfoil, the plurality of cooling conduits including a group of suction side cooling conduits proximate to the suction side, the group of suction side cooling conduits having a first sum of areas at an eighth plane radially spaced 0.0400 meters from the base plane, the group of suction side cooling conduits having a second sum of areas at an nineth plane radially spaced 0.0476 meters from the base plane, an average of the first sum and the second sum defining a suction side cross-sectional area (SSA), wherein the suction side cross-sectional area (SSA) is from 0.000005 m² to 0.00000945 m², and wherein, $$20.927 \le \left(\frac{71}{100,000}\right) * \left(\frac{\hat{A}_2 + \hat{A}_6}{\hat{A}_7}\right)^3 *$$

$$\left(\frac{\hat{A}_4}{\hat{A}_5}\right)^{\hat{A}_3} * \left(\frac{0.005\,m^2}{SSA\,(m^2)}\right) * \left(\frac{EGT(°C.)}{221(°C.)}\right) * \left(\frac{N(Hz)}{300\,Hz}\right)^2 \le 171.427.$$

The blade assembly of any preceding clause, further including a plurality of inlet passages located within the shank, the plurality of inlet passages including the leading-edge inlet passage.

The blade assembly of any preceding clause, wherein each of the inlet passages extends between the base and one or more of the plurality of cooling conduits.

The blade assembly of any preceding clause, wherein the plurality of inlet passages further includes a middle inlet passage and a trailing-edge inlet passage.

The blade assembly of any preceding clause, wherein the shank is configured as a dovetail.

The blade assembly of any preceding clause, wherein the blade assembly is a stage one blade assembly of a high-pressure turbine of a gas turbine engine.

The blade assembly of any preceding clause, wherein the first cross-sectional area is approximately equal to the seventh cross-sectional area.

The following claims are hereby incorporated into this Detailed Description by this reference, with each claim standing on its own as a separate embodiment of the present disclosure.

What is claimed is:
1. A gas turbine engine, comprising:
an engine core configured to generate a redline exhaust gas temperature (EGT) in a range of 988 Celsius (° C.) to 1120° C. and having a redline core speed (CS) in a range of 306 Hertz to 353 Hertz, the engine core extending along an engine centerline and including:
a compressor section;
a combustor; and
a turbine section, the turbine section including a blade assembly rotatable about the engine centerline, the blade assembly comprising:
a platform having an upper surface and a lower surface;
an airfoil extending from the upper surface of the platform, the airfoil having an exterior surface, the exterior surface defining a pressure side and a suction side, the airfoil including a leading-edge and a trailing-edge;
a shank extending from the lower surface, the shank having a base defining a base plane;
a leading-edge inlet passage located within the shank, the leading-edge inlet passage having:
a first cross-sectional area at a first plane, the first plane radially spaced 0.0167 meters from the base plane;
a second cross-sectional area at a second plane, the second plane radially spaced 0.0182 meters from the base plane, a first ratio of the second cross-sectional area and the first cross-sectional area defining a second normalized area ($\hat{A}_2$) in a range of 0.996 to 1.139;
a third cross-sectional area at a third plane, the third plane radially spaced 0.0212 meters from the base plane, a second ratio of the third cross-sectional area and the first cross-sectional area defining a third normalized area ($\hat{A}_3$) in a range of 1.485 to 1.620;
a fourth cross-sectional area at a fourth plane, the fourth plane radially spaced 0.0226 meters from the base plane, a third ratio of the fourth cross-sectional area and the first cross-sectional area defining a fourth normalized area ($\hat{A}_4$) in a range of 1.743 to 1.861;
a fifth cross-sectional area at a fifth plane, the fifth plane radially spaced 0.0277 meters from the base plane, a fourth ratio of the fifth cross- sectional area and the first cross-sectional area defining a fifth normalized area ($\hat{A}_5$) in a range of 1.155 to 1.262;

a sixth cross-sectional area at a sixth plane, the sixth plane radially spaced 0.0294 meters from the base plane, a fifth ratio of the sixth cross-sectional area and the first cross-sectional area defining a sixth normalized area ($\hat{A}_6$) in a range of 1.039 to 1.179; and a seventh cross-sectional area at a seventh plane, the seventh plane radially spaced 0.0341 meters from the base plane, a sixth ratio of the seventh cross-sectional area and the first cross-sectional area defining a seventh normalized area ($\hat{A}_7$) in a range of 0.89 to 1.078; and a plurality of cooling conduits located within the airfoil, the plurality of cooling conduits including a group of suction side cooling conduits proximate to the suction side, the group of suction side cooling conduits having a first sum of areas at an eighth plane radially spaced 0.0400 meters from the base plane, the group of suction side cooling conduits having a second sum of areas at a ninth plane radially spaced 0.0476 meters from the base plane, an average of the first sum and the second sum defining a suction side cross-sectional area (SSA), wherein the suction side cross-sectional area (SSA) is from 0.000005 $m^2$ to 0.00000945 $m^2$, and wherein, $$20.927 \leq \left(\frac{71}{100,000}\right) * \left(\frac{\hat{A}_2 + \hat{A}_6}{\hat{A}_7}\right)^3 *$$

$$\left(\frac{\hat{A}_4}{\hat{A}_5}\right)^{\hat{A}_3} * \left(\frac{0.005\,m^2}{SSA\,(m^2)}\right) * \left(\frac{EGT(^\circ C.)}{221(^\circ C.)}\right) * \left(\frac{CS(Hz)}{300\,Hz}\right)^2 \leq 171.427.$$

2. The gas turbine engine of claim 1, further including a plurality of inlet passages located within the shank, the plurality of inlet passages including the leading-edge inlet passage.

3. The gas turbine engine of claim 2, wherein each of the inlet passages extends between the base and one or more of the plurality of cooling conduits.

4. The gas turbine engine of claim 2, wherein the plurality of inlet passages further includes a middle inlet passage and a trailing-edge inlet passage.

5. The gas turbine engine of claim 1, wherein the shank is configured as a dovetail.

6. The gas turbine engine of claim 1, wherein the blade assembly is a stage one blade assembly of a high-pressure turbine of the turbine section.

7. The gas turbine engine of claim 1, wherein the first cross-sectional area is equal to the seventh cross-sectional area.

8. A blade assembly for a gas turbine engine having an engine core configured to generate a redline exhaust gas temperature (EGT) in a range of 988 Celsius (° C.) to 1120° C. and having a redline core speed (CS) in a range of 306 Hertz to 353 Hertz, the blade assembly to be connected to the engine core and rotatable about an engine centerline of the engine core, the blade assembly comprising:

a platform having an upper surface and a lower surface;

an airfoil extending from the upper surface of the platform, the airfoil having an exterior surface, the exterior surface defining a pressure side and a suction side, the airfoil including a leading edge and a trailing edge;

a shank extending from the lower surface, the shank having a base defining a base plane;

a leading-edge inlet passage located within the shank, the leading-edge inlet passage having:

a first cross-sectional area at a first plane, the first plane radially spaced 0.0167 meters from the base plane;

a second cross-sectional area at a second plane, the second plane radially spaced 0.0182 meters from the base plane, a first ratio of the second cross-sectional area and the first cross-sectional area defining a second normalized area ($\hat{A}_2$) in a range of 0.996 to 1.139;

a third cross-sectional area at a third plane, the third plane radially spaced 0.0212 meters from the base plane, a second ratio of the third cross-sectional area and the first cross-sectional area defining a third normalized area ($\hat{A}_3$) in a range of 1.485 to 1.620;

a fourth cross-sectional area at a fourth plane, the fourth plane radially spaced 0.0226 meters from the base plane, a third ratio of the fourth cross-sectional area and the first cross-sectional area defining a fourth normalized area ($\hat{A}_4$) in a range of 1.743 to 1.861;

a fifth cross-sectional area at a fifth plane, the fifth plane radially spaced 0.0277 meters from the base plane, a fourth ratio of the fifth cross-sectional area and the first cross-sectional area defining a fifth normalized area ($\hat{A}_5$) in a range of 1.155 to 1.262;

a sixth cross-sectional area at a sixth plane, the sixth plane radially spaced 0.0294 meters from the base plane, a fifth ratio of the sixth cross-sectional area and the first cross-sectional area defining a sixth normalized area ($\hat{A}_6$) in a range of 1.039 to 1.179; and a seventh cross-sectional area at a seventh plane, the seventh plane radially spaced 0.0341 meters from the base plane, a sixth ratio of the seventh cross-sectional area and the first cross-sectional area defining a seventh normalized area ($\hat{A}_7$) in a range of 0.89 to 1.078; and a plurality of cooling conduits located within the airfoil, the plurality of cooling conduits including a group of suction side cooling conduits proximate to the suction side, the group of suction side cooling conduits having a first sum of areas at an eighth plane radially spaced 0.0400 meters from the base plane, the group of suction side cooling conduits having a second sum of areas at a ninth plane radially spaced 0.0476 meters from the base plane, an average of the first sum and the second sum defining a suction side cross-sectional area (SSA), wherein the suction side cross-sectional area (SSA) is from 0.000005 $m^2$ to 0.00000945 $m^2$, and wherein, $$20.927 \leq \left(\frac{71}{100,000}\right) * \left(\frac{\hat{A}_2 + \hat{A}_6}{\hat{A}_7}\right)^3 *$$

$$\left(\frac{\hat{A}_4}{\hat{A}_5}\right)^{\hat{A}_3} * \left(\frac{0.005\,m^2}{SSA\,(m^2)}\right) * \left(\frac{EGT(^\circ C.)}{221(^\circ C.)}\right) * \left(\frac{CS(Hz)}{300\,Hz}\right)^2 \leq 171.427.$$

9. The blade assembly of claim 8, further including a plurality of inlet passages located within the shank, the plurality of inlet passages including the leading-edge inlet passage.

10. The blade assembly of claim 9, wherein each of the inlet passages extends between the base and one or more of the plurality of cooling conduits.

11. The blade assembly of claim 9, wherein the plurality of inlet passages further includes a middle inlet passage and a trailing-edge inlet passage.

12. The blade assembly of claim 8, wherein the shank is configured as a dovetail.

13. The blade assembly of claim 8, wherein the blade assembly is a stage one blade assembly of a high-pressure turbine of the gas turbine engine.

14. The blade assembly of claim 8, wherein the first cross-sectional area is equal to the seventh cross-sectional area.

* * * * *